United States Patent [19]

Tsujimoto et al.

[11] Patent Number: 4,888,610
[45] Date of Patent: Dec. 19, 1989

[54] DISPLAY APPARATUS

[75] Inventors: Shinichi Tsujimoto; Kenichiro Amano, both of Tokyo; Kenji Itch, Kanagawa, all of Japan

[73] Assignee: Canon Kabushiki Kaisha, Tokyo, Japan

[21] Appl. No.: 262,000

[22] Filed: Oct. 25, 1988

[30] Foreign Application Priority Data

Oct. 28, 1987 [JP] Japan ................................ 62-272061

[51] Int. Cl.⁴ ...................... G03B 17/18; G03B 17/24; G09G 3/02; G09G 3/04
[52] U.S. Cl. .................................... 354/475; 354/106; 354/289.1; 340/711; 340/756; 340/789
[58] Field of Search ............... 354/475, 105, 106, 109, 354/289.1, 289.12, 484; 340/711, 756, 789, 794, 811

[56] References Cited

U.S. PATENT DOCUMENTS

| 3,749,896 | 7/1973 | Munt ............................... 340/756 X |
| 3,786,480 | 1/1974 | Hatano et al. ................... 340/756 X |

Primary Examiner—W. B. Perkey
Attorney, Agent, or Firm—Fitzpatrick, Cella, Harper & Scinto

[57] ABSTRACT

A display apparatus includes a display unit in which a number of digits for display is finite, a memory for storing a plurality of display items each having a predetermined number of digits for display, a display item selecting unit for selecting at least one display item from among the display items stored in the memory so as to display the same in the display unit, and a display controlling unit for effecting control so as to display on the display unit the display item selected by the display item selecting unit. When a display item having a number of digits exceeding the final digit of the display unit is selected, the display controlling unit inhibits the display of the display item concerned.

11 Claims, 8 Drawing Sheets

| CLASSIFICATION OF ITEM | NO. | DISPLAY ITEM | EXAMPLE OF DISPLAY | NUMBER OF DIGITS |
|---|---|---|---|---|
| DISPLAY ITEM HAVING A FIXED NUMBER OF DIGITS | ① | DATE | S E P . _ 2 2 ' 8 7 _ | 10 |
| | ② | TIME | _ 1 4 : 1 5 : 1 0 _ | 9 |
| | ③ | SHUTTER SPEED, APERTURE VALUE (Tv, Av) | 4 0 0 0 _ F 5 . 6 _<br>_ 2 5 0 _ F _ 1 6 _ | 10 |
| | ④ | FOCAL LENGTH OF PHOTOGRAPHIC LENS | _ _ 1 2 0 0 _<br>_ _ _ 5 0 _ | 6 |
| | ⑤ | FILM NUMBER | N O . 0 0 2 4 _ | 8 |
| DISPLAY ITEM HAVING AN ARBITRARY NUMBER OF DIGITS | ⑥ | COMMENT | U S E _ F I L L - I N _ F L A S H _<br>T O K Y O _ T O W E R _ | ARBITRARY |

NOTE) "_" INDICATES A NUMBER OF DIGITS THAT ARE SECURED AS SPACE.

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|
| K | A | W | A | S | A | K | I | S | H | I | | T | A | K | A | T | S | U | | T | E | L | O | 4 | 4 | – | 8 | 1 | 1 |

100 →

– 2 1 1  DISPLAY INHIBITED

FIG.9(b)

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|
| S | A | K | I | S | H | I | | T | A | K | A | T | S | U | | T | E | L | O | 4 | 4 | – | 8 | 1 | 1 | – | 2 | 1 | 1 |

100 →

K A W A  DELETED

DISPLAY APPARATUS

BACKGROUND OF THE INVENTION

1. Field of the Invention

This invention relates to a display apparatus in which the number of digits which can be displayed simultaneously is finite.

2. Description of the Related Art

Figure 9A:
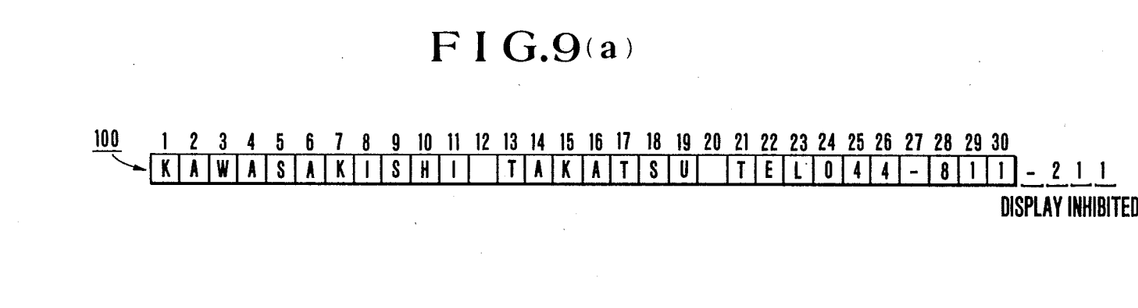
FIGS. 9(a) and 9(b) are diagrams illustrating states of display by a conventional display apparatus.
Figure 9B:
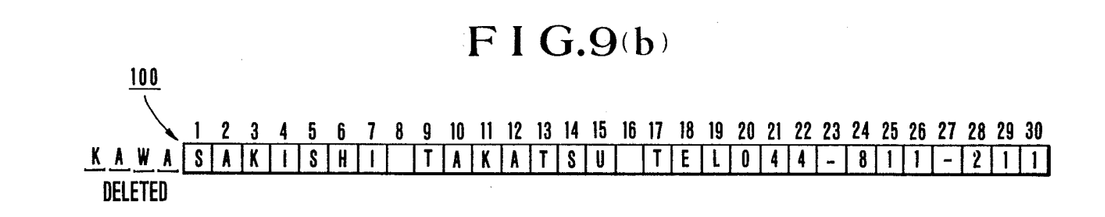

As shown in FIGS. 9(a) and 9(b), two methods are generally adopted as displaying methods in a display apparatus in which the number of digits which can be displayed is finite. When the number of digits which can be displayed by a display unit 100 is, for instance, 30, if display information whose number of digits exceeds that number is input, the input of the 31st digit and onward is inhibited in FIG. 9(a), while the display information on the leading side is deleted (scrolled) in FIG. 9(b), thereby making it possible to input the 31st digit and onward.

However, the telephone number in FIG. 9(a) and the address "KAWASAKISHI" in FIG. 9(b) are displayed incompletely, and the display information as a whole is thus utterly meaningless. Hence, there is a possibility of giving erroneous information, so that it may be even better not to display it at all. In addition, this results in an inconvenience and bad economy in that the effective number of digits of the display unit of the display apparatus, whose number of digits is finite is occupied by a number of wasteful characters.

SUMMARY OF THE INVENTION

Accordingly, an object of the present invention is to provide a display apparatus which is capable of preventing the display of erroneous information occurring due to a restriction in the number of displayable digits and of positively displaying required display information, when a plurality of items are displayed simultaneously on a display unit whose number of digits is finite.

To this end, display apparatus in accordance with the present invention comprises: display means in which a number of digits for a display is finite, memory means for storing a plurality of display items each having a predetermined number of digits for display, display item selecting means for selecting at least one display item from among the display items stored in the memory means so as to display the same on the display means, and display controlling means for effecting control so as to display on the display means the display item selected by the display item selecting means. The display controlling means inhibits the display of the display item concerned when a display item having a number of digits exceeding the final digit of the display means is selected.

The above and other objects, features and advantages of the present invention will become more apparent from the following detailed description of an embodiment thereof when read in conjunction with the accompanying drawings.

DETAILED DESCRIPTION OF THE PREFERRED EMBODIMENT

Referring now to the accompanying drawings, a description will be given of an embodiment of the present invention.

Figure 1:
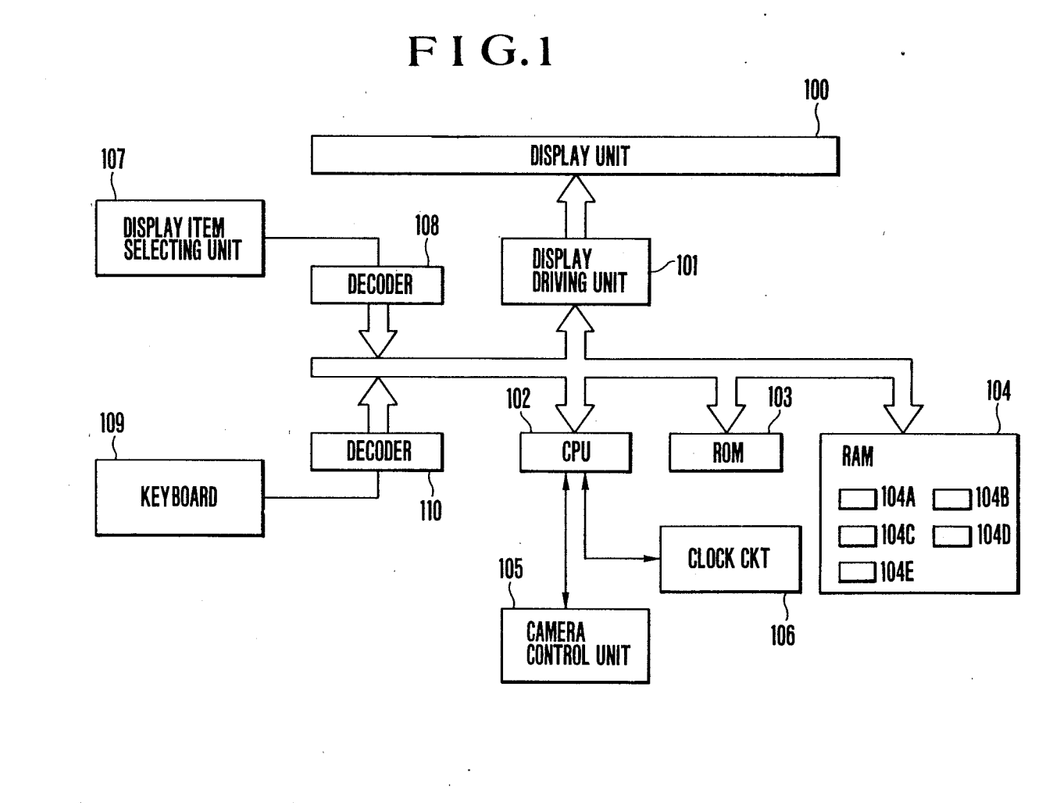
FIG. 1 is a block diagram illustrating an embodiment of a display apparatus in accordance with the present invention.

FIG. 1 is a block diagram illustrating an embodiment in which the present invention is applied to a display apparatus such as is used for data imprinting in a camera.

Figure 6:
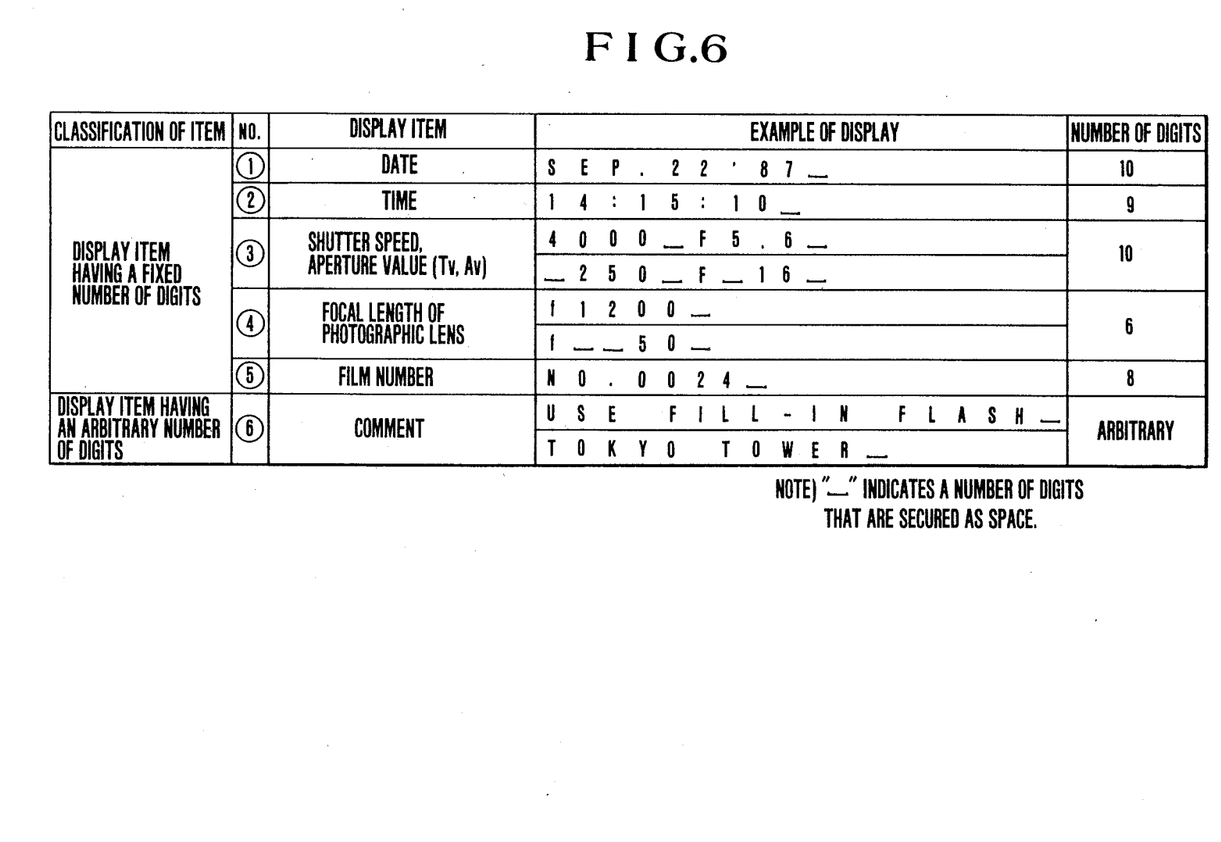
FIG. 6 is a diagram illustrating display items.

A known display unit 100 has the finite number of 30 digits. A display driving unit 101 is connected to the display unit 100 and is constituted by a decoder and a driver which are both known. A known CPU (central processing unit) 102 controls the overall operation. A ROM (read-only memory) 103 is a memory in which the programmed operation of the display apparatus has been stored. A RAM (random access memory) 104 stores imprinting character data and comment data and has a digit number counter 104A and the like. Display items, each of which has a fixed number of digits and is provided with contents such as those shown in Nos. ① to ⑤ in FIG. 6, are stored in the RAM 104 in interlinking relationship with a photographing operation. The number of digits of each of these display items is predetermined, and the display items are of such nature that they would lose their meaning as information if any one of the characters is missing. In addition, another display item having an arbitrary number of digits, which has contents such as those shown in No. ⑥ in FIG. 6 and is supplied through a keyboard unit 109, is also stored in the RAM 104. The display items Nos. ① to ⑤ each having a fixed number of digits are items of information which are output automatically from a known camera control unit 105 or from a known built-in clock circuit 106 with a calendar during the shooting of a photograph, and the number of digits in each item has been predetermined. The display item No. ⑥ having an arbitrary number of digits is such individual information concerning which the photographer wishes to carry out recording, data imprinting or the like independently or simultaneously with display items Nos. ① to ⑤ each having a fixed number of digits, the number of digits of the display item No. ⑥ being arbitrary in accordance with the intention of the photographer. In addition, it is also possible to change the number of information digits of the display item No. ⑥ in conformity with the remaining number of digits in the display unit 100, and the priority of display thereof is lower than those of the aforementioned display items each having a fixed number of digits. A display item selecting unit 107 is constituted by a slide switch or the like and is adapted to determine whether or not the respective display items stored in the RAM 104 are to be displayed. A decoder 108 transmits to the CPU 102 the data input from the keys of the display item selecting unit 107, while a decoder 110 transmits to the CPU 102 English characters, kana characters, or the like from a keyboard unit 109. Among display items Nos. ① to ⑥ stored in the RAM 104, with respect to the data and time (hour, minute and second) of the display items Nos. ① and ②, the RAM 104 fetches data from the clock circuit 106. With respect to display item No. ③ on the Tv/Av data as well as display item No. ④ the lens data, the RAM 104 fetches data from the camera control unit 105. The data on the number of photographed frames in display item No. ⑤ is fetched to an imprinting data storing area from a counter provided in the RAM 104 and adapted to increment by one each time a release signal is received from the camera control unit 105. In addition, as for data on the comment in display item No. ⑥, data stored in a predetermined storing area 104B of the RAM 104 is fetched to the imprinting data storing area. The respective data are stored in an imprinting data storing area 104c located in the RAM 104 by the operation of the CPU 102 in accordance with the state of the selecting unit 107 which selects the display or non-display of the respective display items, and the data stored in the area 104C is displayed by the display unit 100 via the display driving unit 101.

Figure 7A:
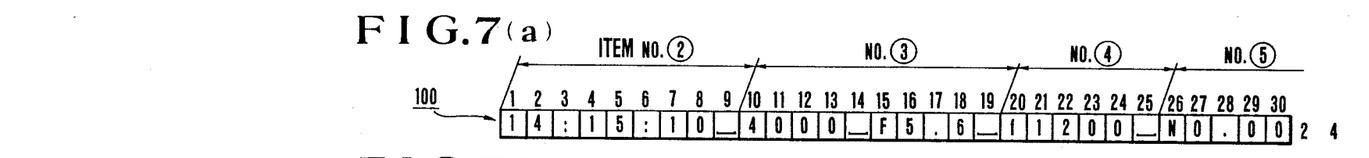
FIGS. 7(a) to 7(c), 8(a) and 8(b) are diagrams illustrating states of display by the display apparatus shown in FIG. 1.
Figure 7B:
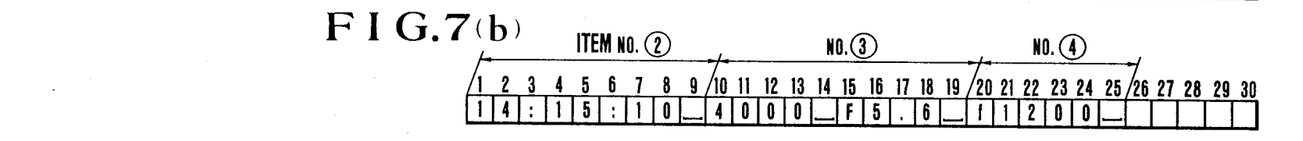
Figure 7C:
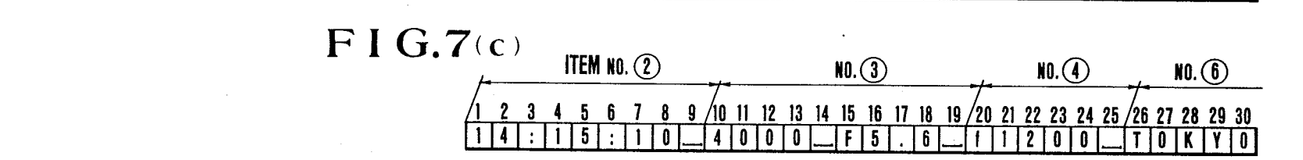

When display items Nos. ②, ③, ④, and ⑤ are to be displayed, as shown in FIGS. 7(a), the last two digits of display item No. ⑤ will exceed the number of digits of the display unit 100, and, if this state continues, erroneous information will be displayed and imprinted as faulty data. Accordingly, in the present invention, as shown in FIG. 7(b), the data of display item No. ⑤ is not displayed and the display of incomplete information is inhibited. Furthermore, when the number of digits of the display items each having a fixed number of digits does not fill the number of digits of the display unit 100, the arrangement is such that the surplus space can be used effectively by filling the same with the display item having an arbitrary number of digits, as shown in FIG. 7(c).

Figures 8A, 8B:
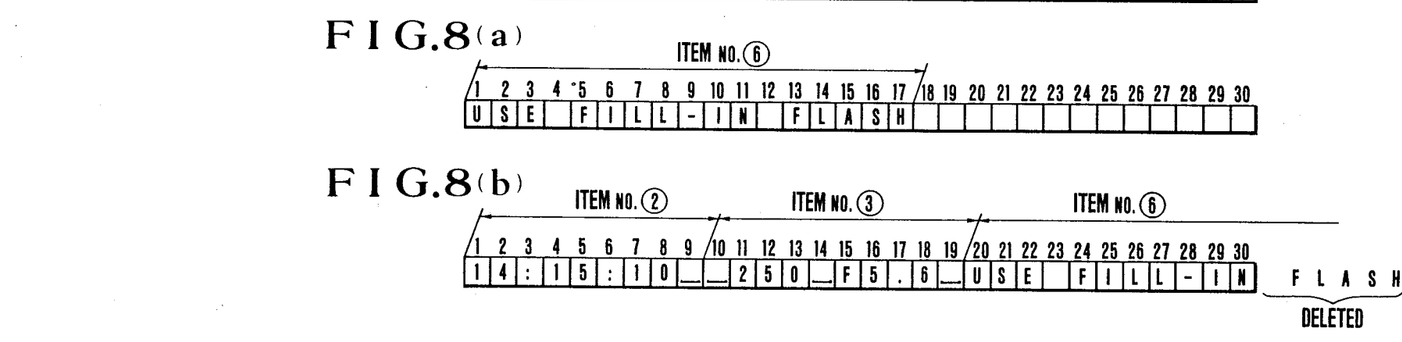

In addition, as shown in FIG. 8(a), in a state in which the display item having an arbitrary number of digits is already being displayed, when a display item having a fixed number of digits is selected, the overall display of the display items with a fixed number of digits can be displayed with priority to the display of the display item having an arbitrary number of digits.

Figure 2:
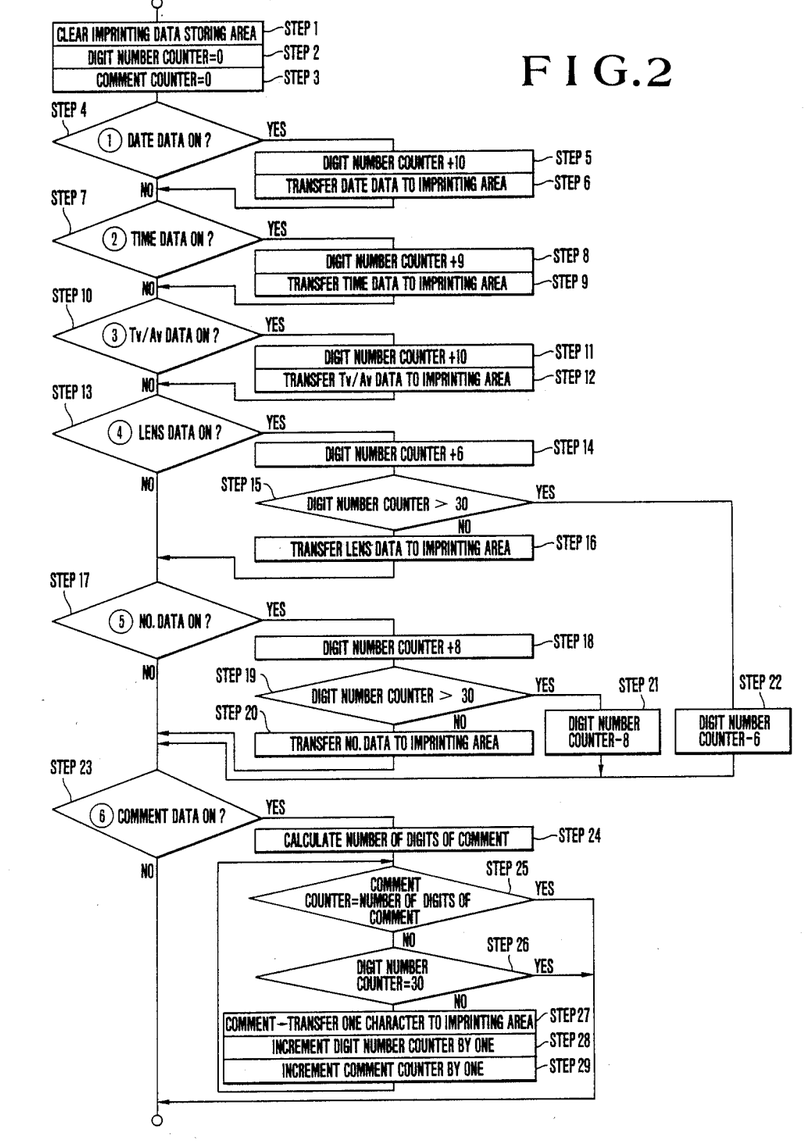
FIG. 2 is a flowchart illustrating the operation of the display apparatus shown in FIG. 1.

Referring now to the flowchart of FIG. 2, a more detailed description will be made of the operation of the CPU 102.

A description will be given on the assumption that it has been determined by the selecting unit 107 that the date data and the data on the number of photographed frames are not to be displayed, but the time data, Tv/Av data, lens data, and comment data are to be displayed. It is assumed that a case where the display is selected by the selecting unit 107 is ON, and a case where the non-display is selected thereby is OFF.

Figure 3A:
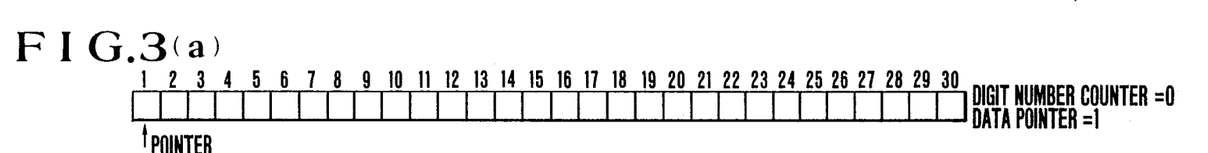
FIGS. 3(a) to 3(e), 4(a) to 4(c), and 5(a) to 5(e) are diagrams respectively illustrating states of display by the display apparatus shown in FIG. 1.

First, initialization is effected in Steps 1, 2 and 3. In other words, the imprinting data storing area 104C located in the RAM 104 is cleared, and the contents of the digit number counter and the comment counter are set to zero. (In the state shown in FIG. 3(a), the data pointer designates a place to which an ensuing input is to be effected, and is always at a position of the digit number counter +1.)

In Step 4, determination is then made as to whether or not the date data in display item No. ① is ON. If ON, Steps 5 and 6 are executed, but since it is OFF in this case, as described above, the operation proceeds to the next step.

Figure 3B:
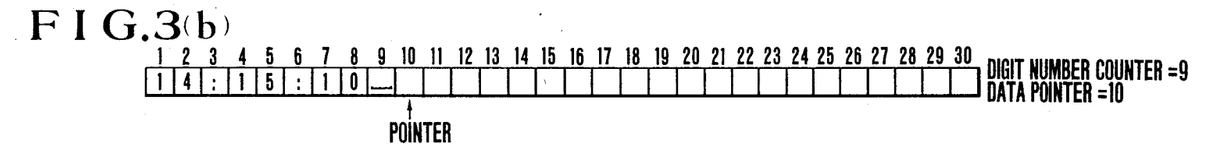

In Step 7, determination is made as to whether or not the time data in display item No. ② is ON. Since it is ON in the case, 9 is added to the digit number counter 104A in Step 8, and the time data is transferred to the imprinting data storing area 104C (the state shown in FIG. 3(b)).

In Step 10, determination is made as to whether or not the Tv/Av data in display item No. ③ is ON. Since it is ON in this case, 10 is added to the digit number counter 104A in Step 11, and the Tv/Av data is transferred to the imprinting data storing area 104C.

In Step 13, determination is made as to whether or not the lens data in display item No. ④ is ON. Since it is ON In this case, 6 is added to the digit number counter 104A in Step 14. When all the display items ① to ⑥ are ON, i.e., when an instruction is given to display all the items ① to ⑥, the number of display digits has exceeded the number of digits of the display unit 100, so that determination is made in Step 15 as to whether or not the digit number counter 104A has exceeded the 30 digits, which is the number of digits of the display unit 100. If it has exceeded that number, Step 22 is executed, ⑥ is subtracted from the digit number counter by way of the number of digits of the lens data. In this case, however, the number of digits has not exceeded 25 (9+10+6), so that the lens data is transferred to the imprinting data storing area 104C (the state shown in FIG. 3(c)).

In Step 17, determination is made as to whether or not the film number data in display item No. ⑤ is ON. If ON, Steps 18 to 21 are executed, but since it is OFF in this case, the operation proceeds to an ensuing step.

In Step 23, determination is made as to whether or not the comment data in display item No. ⑥ is ON. Since it is ON in this case, the number of digits of the comment is first calculated. This calculation is executed in the form of consecutively returning to an immediately preceding area from a final area in the comment data storing area 104B provided in the RAM 104. A character which does not constitute a space is searched, and the number of digits of the comment is calculated from the number of digits until the character is found (see FIG. 3(e)).

In Step 25, determination is made as to whether or not the content of the comment counter 104E is equivalent to the number of digits of the comment obtained in the aforementioned calculation. Since the content of the comment counter 104E is zero in the state in which no comment data has been transferred to the imprinting data storing area 104C, the operation proceeds to Step 26.

In Step 26, determination is made as to whether or not the digit number counter 104A has equaled 30 digits. In this case, since the number of digits is still 25, as described above, the operation proceeds to Step 27. After, in Step 27, one character is transferred from the comment data storing area 104B to the imprinting data storing area 104C, both the digit number counter 104A and the comment counter 104E are incremented by one in Steps 28 and 29, respectively, and the operation then returns to Step 25. When all the characters of the comment data have been transferred or when the imprinting data storing area 104C has reached digits as a result of repeating the operation in Steps 25 through 29, this repeated routine is computed in Step 25 or 26. (FIG. 3(d)) shows a state in which three characters of the comment have been transferred).

In the above, a description has been given of a case where the date data in display item No. ① and the film number data in display item No. ⑤ are OFF, while the time data in display item No. ②, the Tv/Av data in display item No. ③, the lens data in display item No. ④, and the comment data in display item No. ⑥ set to ON. As other examples, however, a description will be given of the following two examples:

(A) The date data in display item No. ① and the comment data in display item No. ⑥ are OFF, while the time data in display item No. ②, the Tv/Av data in display item No. ③, the lens data in display item No. ④, and the film number data in display item No. ⑤ are ON.

(B) The comment in display item No. ⑥ is ON, while, as for the other display items, the time data in display item No. ② and the Tv/Av data in display item No. ③ are sequentially turned ON from the state of OFF.

Figure 3C:
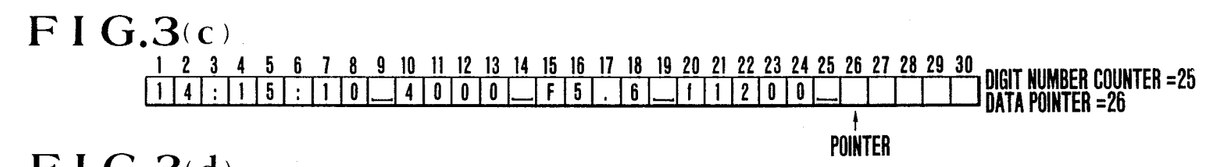
Figure 3D:
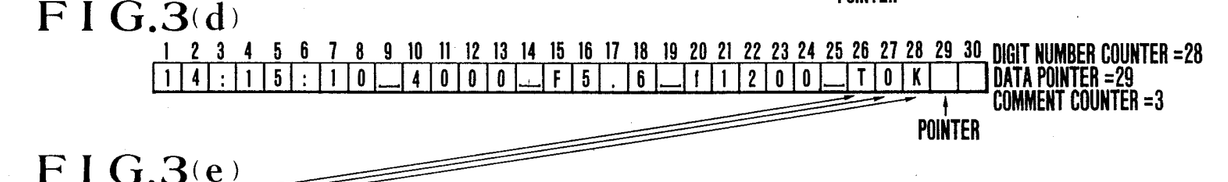
Figure 3E:
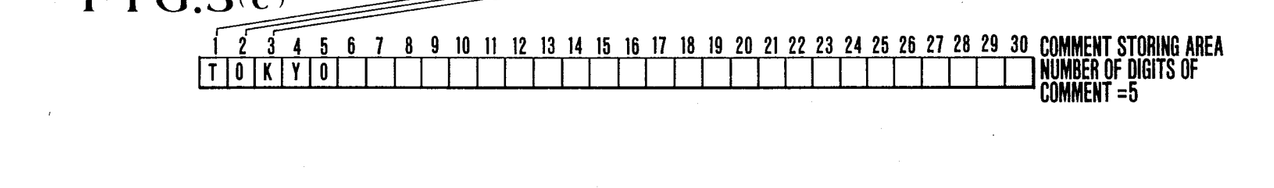
Figures 4A, 4B, 4C:
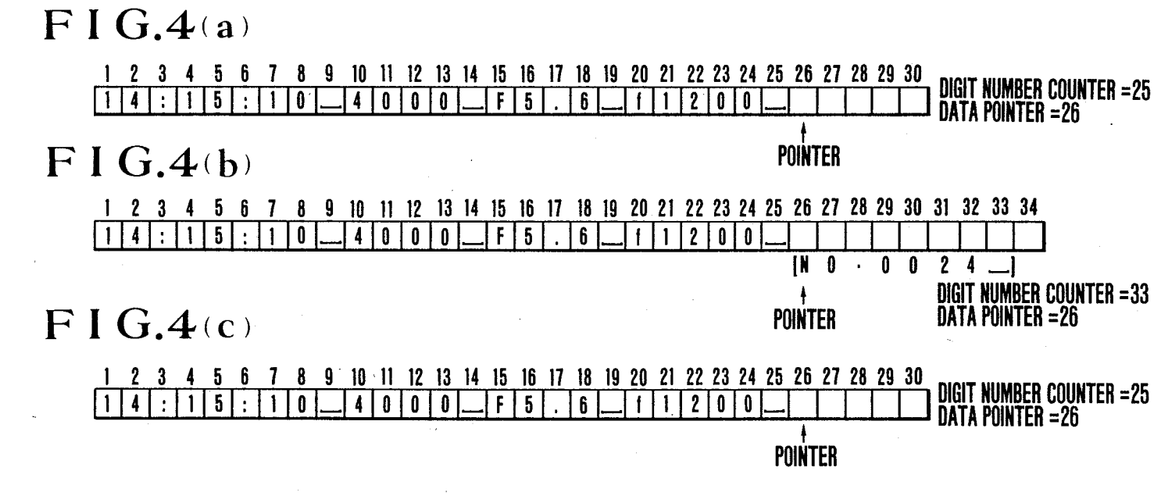

In example A, the operation is the same up to Step 16 as the above-described example (the state in which FIG. 3(c)=FIG. 4(a).)

In Step 17, determination is made as to whether or not the film number data in display item No. ⑤ is ON. In this case, since it is ON, eight is added to the digit number counter 104A in Step 18 (the state shown in FIG. 4(b)) where determination is made as to whether or not the digit number counter has exceeded 30 digits. In this case, because the digit counter number exceeds that figure since 25+8=33>30, Step 20 is not executed. Then, in Step 21, eight is subtracted from the digit number counter 104A by way of the counted number of digits of the film number information counted in Step 18, i.e., the content of the counter 104A is returned to its formed state, and the operation proceeds to an ensuing step. In Step 23, determination is made as to whether or not the comment data in display item No. 6 is ON. Since it is OFF in this case, Steps 24 to 29 are not executed, and the operation is completed (the state shown in FIG. 4(c)).

In FIG. 4(b), the data pointer remains to designate 26, but this is because eight is added to only the digit number counter 104A and the actual transmission of the film number data has not been effected, so that the data pointer does not move.

Figures 5A, 5B:
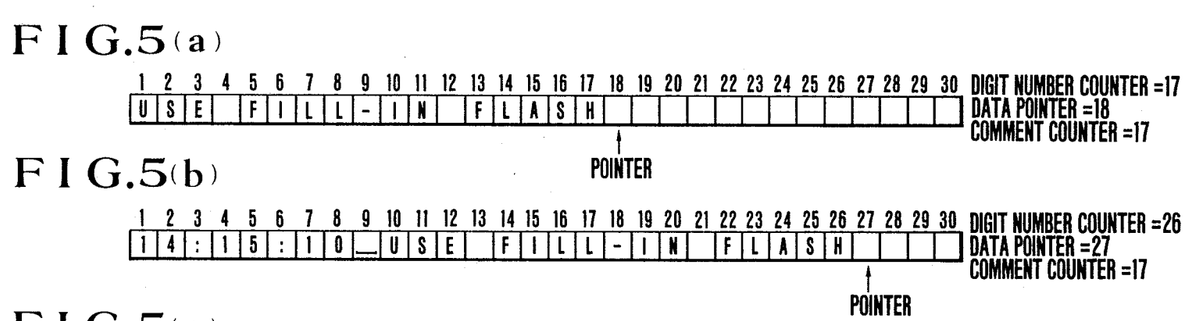

In the above-described example B, since only the comment data in display item No. ⑥ is ON, after Steps 1, 2 and 3 are executed, the operation passes through "NO" in each of the Steps 4, 7, 10, 13, and 17. In Step 23, determination is made as to whether or not the comment data in display item No. ⑥ is ON. Since it is ON in this case, in Step 24, the number of characters of the comment data is calculated, as described above. Characters are sent one at a time in Step 27 from the comment data storing area 104B in the RAM 104 to the imprinting data storing area 104C in the RAM 104 until, in Step 25, the content of the comment counter 104E becomes equal to the number of digits of the comment obtained in the above-described process. When the comment counter 104E in the RAM 104 becomes equal to the number of digits of the comment, the operation moves from Step 25 to another step (the state shown in FIG. 5(a)).

Next, with respect to a case where the time data in display item No. ② has been set to ON, after Steps 1, 2 and 3 are executed. In Step 4, the operation proceeds along the flow of NO. In Step 7, the operation proceeds along the flow of YES, Steps 8 and 9 are then executed, and the operation proceeds to Step 10. Since only the time data in display item No. ② has been set to ON and other items are still OFF, the operation proceeds along the flow of NO. Since the result of the determination is YES in Step 23, Steps 24 to 29 are executed, as described above. Incidentally, since, in this example, only Steps 8 and 9 are added to the above-described operation, a detailed description of the operation will be omitted (the state shown in FIG. 5(b)).

Figures 5C, 5D, 5E:
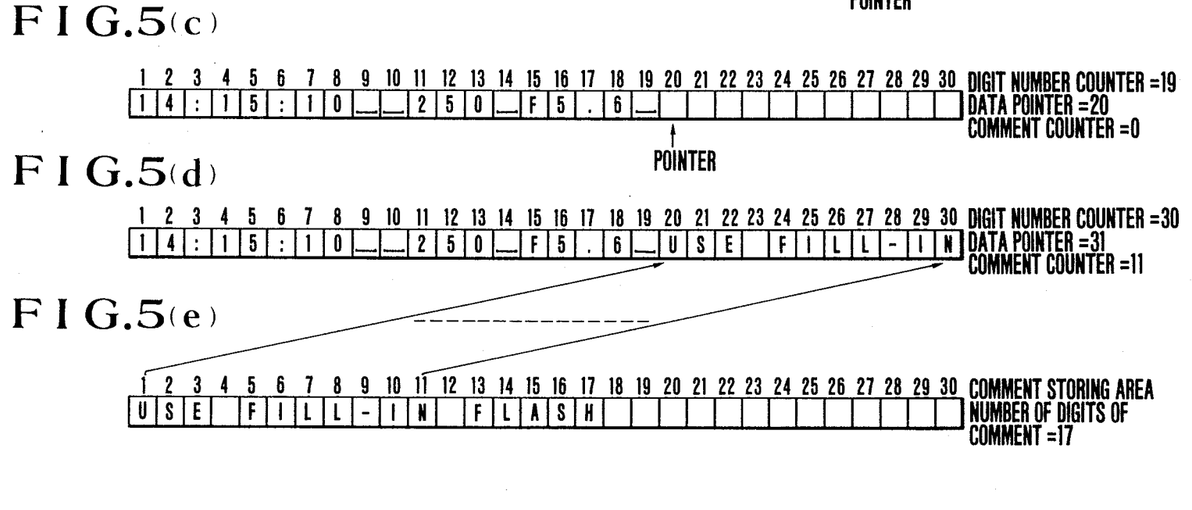

Furthermore, with respect to a case where the Tv/Av data in display item No. ③ is set to ON, after Steps 1, 2 and 3 are executed, the result of determination in Step 4 is NO, and the result of determination in Step 7 is YES, so that Steps 8 and 9 are executed, and the operation proceeds to Step 10. Since the result of determination in Step 10 is YES, Steps 11 and 12 are executed, and, in Steps 13 and 17, the operation proceeds along the flow of NO (the state shown in FIG. 5(c)).

In Step 23, determination is then made as to whether or not the comment data in display item No. ⑥ is ON. Since it is ON in this case, the number of digits of the comment data is calculated in Step 24. (See FIG. 5(e), the number of characters of the comment=17.) Then, in Step 25, determination is made as to whether or not the comment counter 104E has become equal to the number of digits of the comment. In Step 26, determination is made as to whether or not the digit number counter 104a has become equivalent to 30 digits. Since the number of digits is still 19, the operation proceeds with a further step. In Step 27, one character is transferred from the comment data storing area 104B to the imprinting data storing area 104C. In Steps 28 and 29, both the digit number counter 104A and the comment counter 104E are incremented by one, and the operation returns to Step 25. In this case, after 11 digits are transferred from the comment data storing area 104B to the imprinting data storing area 104C, the digit number counter 104A assumes 30 characters. Hence, before the operation proceeds along the flow of YES in Step 25, the operation proceeds the flow of YES in Step 26 (the state shown in FIG. 5(d)).

In the above-described embodiment, priorities of display are set on the display items having fixed numbers of digits in the order of display item No. 1 to display item No. ⑤, and yet these display items may be arranged and displayed in the order selected by the display item selecting unit 107.

As has been described above, in accordance with the present invention, in cases where items to be displayed simultaneously are numerous and there is the possibility of the display information being displayed with a part thereof omitted, the display of that display item is inhibited. Accordingly, it is possible to obtain an advantage in that the display leading to erroneous information and wasteful display can be prevented.

What is claimed is:

1. A display apparatus for a camera, comprising:
   first generating means for generating a signal having a certain number of digits for display and representing displaying contents;
   second generating means for generating a signal having a certain number of digits for display and representing displayed contents;
   a display unit which has a predetermiend number of displayable digits, responds to said first and second generating means, and is adapted to display contents related to signals output from said first and second generating means; and inhibiting means which responds to at least one of the signals output from said first and second generating means, compares a number of digits for display contained in the output signal with said predetermined number of displayable digits of said display unit, and is adapted to inhibit said display unit from displaying contents related to the output signal when said number of digits for display contained in the output signal exceeds said predetermined number of displayable digits of said display unit.

2. A display apparatus according to claim 1, wherein said number of digits contained in the signal generated by said first generating means is a predetermined number of digits.

3. A display apparatus according to claim 1, wherein said number of digits contained in the signal generated by said second generating means is an arbitrary number of digits.

4. A display apparatus according to claim 3, wherein said second generating means comprises a keyboard unit for setting contents to be displayed and a memory unit for storing a digital signal corresponding to a signal output from said keyboard unit.

5. A display apparatus according to claim 4, wherein said memory unit includes a random access memory.

6. A display apparatus comprising:
first generating means for generating a signal having a certain number of digits for display and representing displayed contents;
second generating means for generating a signal having a certain number of digits for display and representing displayed contents;
a display unit which has a predetermined number of displayable digits, responds to said first and second generating means, and is adapted to display contents related to signals output from said first and second generating means, and
inhibiting means which responds to at least one of the signals output from said first and second generating means, compares a number of digits for display contained in the output signal with said predetermined number of displayable digits of said display unit, and is adapted to inhibit said display unit from displaying contents related to the output signal when said number of digits for display contained in the output signal exceeds said predetermined number of displayable digits of said display unit.

7. A display apparatus comprising:
first generating means for generating a signal having a certain number of digits for display and representing displayed contents;
second generating means for generating a signal having a certain number of digits for display and representing displayed contents;
a display unit which has a predetermined number of displayable digits, responds to said first and second generating means, and is adapted to display contents related to signals output from said first and second generating means;
inhibiting means which responds to at least one of the signals output from said first and second generating means, compares a number of digits for display contained in the output signal with said predetermined number of displayable digits of said display unit, and is adapted to inhibit said display unit from displaying contents related to the output signal when said number of digits for display contained in the output signal exceeds said number of displayable digits of said display unit; and
control means for controlling said display unit to display signals output from said first and second generating means.

8. A display apparatus according to claim 7, wherein said control means selectively displays contents corresponding to the signal.

9. A display apparatus according to claim 7, wherein said number of digits contained in the signal generated by said first generating means is a predetermined number of digits.

10. A display apparatus according to claim 9, wherein said number of digits contained in the signal generated by said second generating means is an arbitrary number of digits.

11. A display apparatus according to claim 10, further comprising control means for allowing said display unit to preferentially display the signal output from said first generating mean when the total sum of the number of digits contained in the signal output from said first generating means and the number of digits contained in the signal output from said second generating means exceeds said predetermined number of displayable digits of said display unit.

* * * * *

UNITED STATES PATENT AND TRADEMARK OFFICE
CERTIFICATE OF CORRECTION

PATENT NO. : 4,888,610  Page 1 of 2
DATED : December 19, 1989
INVENTOR(S) : Shinichi Tsujimoto, et al.

It is certified that error appears in the above-identified patent and that said Letters Patent is hereby corrected as shown below:

Title page:

[75] INVENTORS:

"Itch," should read --Itoh,--.

COLUMN 1:

Line 42, "display" should read --a display--.

COLUMN 3:

Line 5, "the" (first occurrence) should read --on the--.

Line 16, "104c" should read --104C--.

COLUMN 5:

Line 6, "set" should read --have been set--.

Line 38, "6" should read --⑥--.

COLUMN 6:

Line 28, "104a" should read --104A--.

Line 44, "1" should read --①--.

Line 60, "displaying" should read --displayed--.

UNITED STATES PATENT AND TRADEMARK OFFICE
CERTIFICATE OF CORRECTION

PATENT NO. : 4,888,610

DATED : December 19, 1989

INVENTOR(S) : Shinichi Tsujimoto, et al.

It is certified that error appears in the above-identified patent and that said Letters Patent is hereby corrected as shown below:

Line 64, "predetermiend" should read --predetermined--.

COLUMN 8:

Line 42, "mean" should read --means--.

Signed and Sealed this

Twenty-eighth Day of April, 1992

Attest:

HARRY F. MANBECK, JR.

*Attesting Officer*       *Commissioner of Patents and Trademarks*